April 9, 1929. E. R. BROWN ET AL 1,708,657
THREAD PROTECTOR AND METHOD OF APPLYING THE SAME
Filed Nov. 2, 1927

INVENTOR
Ernest R. Brown
Peter S. Brown

Patented Apr. 9, 1929.

1,708,657

UNITED STATES PATENT OFFICE.

ERNEST R. BROWN AND PORTER S. BROWN, OF WILKINSBURG, PENNSYLVANIA.

THREAD PROTECTOR AND METHOD OF APPLYING THE SAME.

Application filed November 2, 1927. Serial No. 230,489.

Our invention relates to thread protectors, and particularly to thread protectors for preserving threads formed on commercial sizes of pipe during transportation.

The cutting of threads on pipe after the pipe has been transported to its place of use involves a considerable expense in labor, and frequently results in delay to other work. Accordingly, pipe manufacturers frequently form threads on such pipe during the process of manufacture and ship the threaded pipe in bulk. Where the pipe is of large size, such as is used for drilling wells and the like, the weight of the pipe lengths is considerable. Where a large number of such pipes are piled in bulk either in stock or in transit, difficulty has been encountered in preserving the threads during collisions between the pipes. Because of the great weight imposed upon well pipe and the necessity for occasionally coupling and uncoupling such pipes while in a well, small imperfections in the threads constitute a serious objection to the use of such pipe after its arrival in the field. Accordingly, metal caps have heretofore been screwed over the threads of the pipes for protecting them.

As the freight rates on finished pipes are rather high, the additional weight of metal caps has contributed materially to the cost of transporting such pipe, particularly in the larger sizes. Threading protectors onto the pipe ends has involved additional time and expense in the manufacture of such pipes. Thread protectors, as heretofore made, which are easily placed on the pipe threads, are liable to fall off during transportation.

We provide a thread protector having a body of resilient material such as rubber, rubber composition and the like, having a resilient metal reinforcing member embedded therein. The faces of the protector are provided with incomplete or stub threads for engaging the threads on the pipe. Our protector is sufficiently flexible to permit its being driven over the ends of the pipe, as distinguished from being screwed thereon for seating the stub threads in the pipe threads. At the same time it is sufficiently rigid to prevent its loosening during the transportation of the pipe to which it is attached. Protection to the pipe threads is afforded by the resilient character of the material in the protector.

Our thread protector is cheaply manufactured by forming a resilient composition about a resilient metal frame. Different forms of the protector are adaptable for use with either internally or externally threaded pipes by changing the stub teeth from the outer to the inner surface of the protector and by providing an outturned or inturned flange for engaging the pipe end, respectively.

The accompanying drawings illustrate a present preferred embodiment of the invention, in which Fig. 1 is a transverse sectional view of a thread protector embodying our invention;

Figure 1:
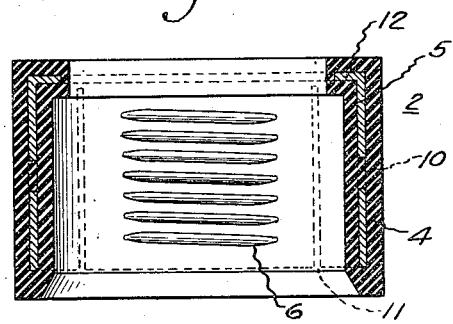
Figure 3:
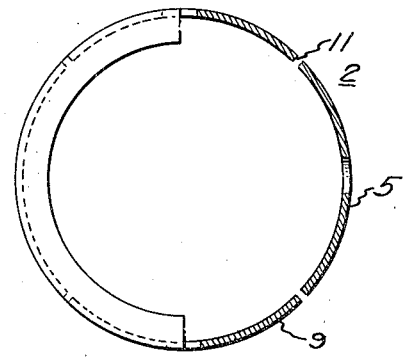
Fig. 3 is a plan view, partially in section, of the reinforcement for the pipe protector.
Figure 2:
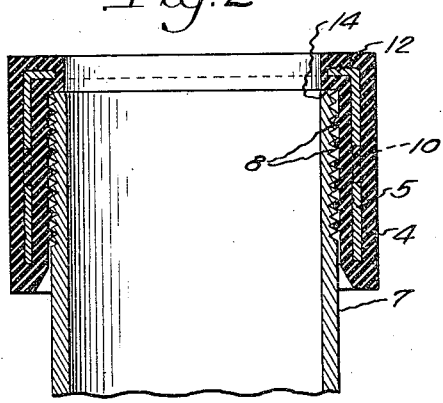
Fig. 2 is a transverse sectional view of the protector applied to an externally threaded pipe.
Figure 4:
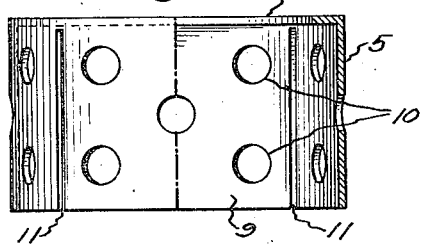
Fig. 4 is an elevational view, partially in section, of the reinforcement shown in Fig. 3.

Referring to Figs. 1 to 4, inclusive, the pipe thread protector is constituted by a body 4 of resilient material having a metallic reinforcing member 5 embedded therein. One form of resilient material 4 is rubber or a rubber composition, although it is to be understood that other types of resilient material may be substituted for the rubber or rubber composition.

For engaging externally threaded pipe, the inner face of the resilient material 4 is provided with threads 6. To permit the threads to slide over pipe threads they are preferably made as incomplete or stub threads arranged in groups about the inner walls of the protector.

The application of the protector to a pipe 7 is secured by pushing the protector 2 over the ends of the pipe 7, as distinguished from screwing it onto the pipe. When so applied, the stub threads 6 slip past threads 8 on the pipe 7 and come to rest between certain of them. The stub threads 6 are disposed at a distance from the end of the thread protector encircling the pipe in order that blows delivered to the ends of the thread protectors, such as are incident to the parallel movement of pipes in transit, produce a compressive effect in the pipe thread protector before the blows are transmitted to the threads. This construction reduces the tendency for threads to become dislodged by reason of longitudinal blows. Where the threads are disposed near the end of the protector longitudinal blows tend to loosen them and push the protector off the pipe. To remove the protector, it is turned to unscrew the stub threads 6 from engagement with the pipe threads 8.

Protection from blows to the pipe threads 8 is obtained by reason of the resilient nature of the composition 4. The force of a blow delivered to the outer surface of the protector 2 is partly dissipated by compressing the material 4 rather than by transmitting the blow directly to the threads 8. Additional protection and rigidity is imparted to the composition 4 by the reinforcing member 5. The reinforcing member 5 is in the form of a metallic cylinder having a side wall 9 provided with perforations 10 and slits 11. Bonds between the composition 4 on the external and internal surfaces of the reinforcing member 5 are formed by the portions of the material of the composition 4 extending through the openings 10 and slots 9. Resiliency of the reinforcing member 5 is secured by the presence of the slits 11.

Protection to the outer end of the pipe is secured by a flange 12 formed on the reinforcing member 5 and extending inwardly and beyond the end 14 of the pipe 7. Flange 12 is embedded in the composition 4.

Figure 5:
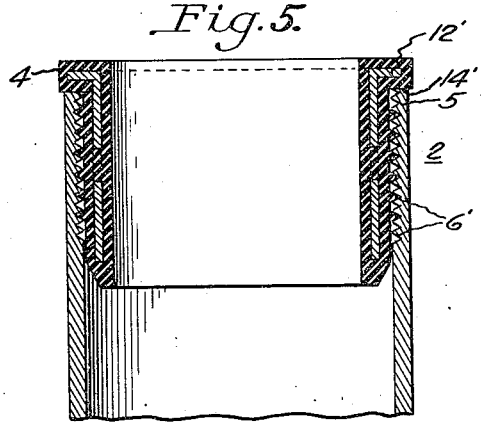
Fig. 5 is a transverse sectional view of a thread protector applied to an internally threaded pipe.
Figure 6:
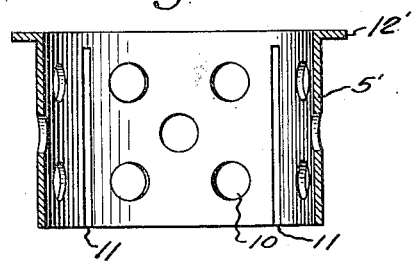
Fig. 6 is a transverse sectional view of the reinforcement for the thread protector shown in Fig. 5.

Referring to Figs. 5 and 6, a modified form of protector 2 is applicable to internally threaded pipe by providing stub teeth 6' on the outer surface thereof. A flange 12' extends outwardly beyond the end 14' of the pipe. The construction of this modification of our invention is otherwise the same as that shown in Figs. 1 to 4, inclusive.

While we have illustrated and described the present preferred modifications of our invention, it will be understood that it may be otherwise embodied or practiced within the scope of the following claims.

We claim:

1. A thread protector comprising a body portion of resilient material, threads formed on a surface of the body portion, and a circumferentially extending reinforcing member having slits formed therein embedded in the body portion with portions of the body portion disposed on both sides of the reinforcing member.

2. A thread protector comprising a body portion of resilient material, threads formed on a surface of the body portion, and a reinforcing member having independently movable sections embedded in the body portion with portions of the body portion disposed on both sides of the reinforcing member.

In testimony whereof we have hereunto set our hands.

ERNEST R. BROWN.
PORTER S. BROWN.